March 15, 1927.
J. CRUZ ET AL
1,621,460
AUTOMOBILE TIRE RIM
Filed April 29, 1925   2 Sheets-Sheet 2
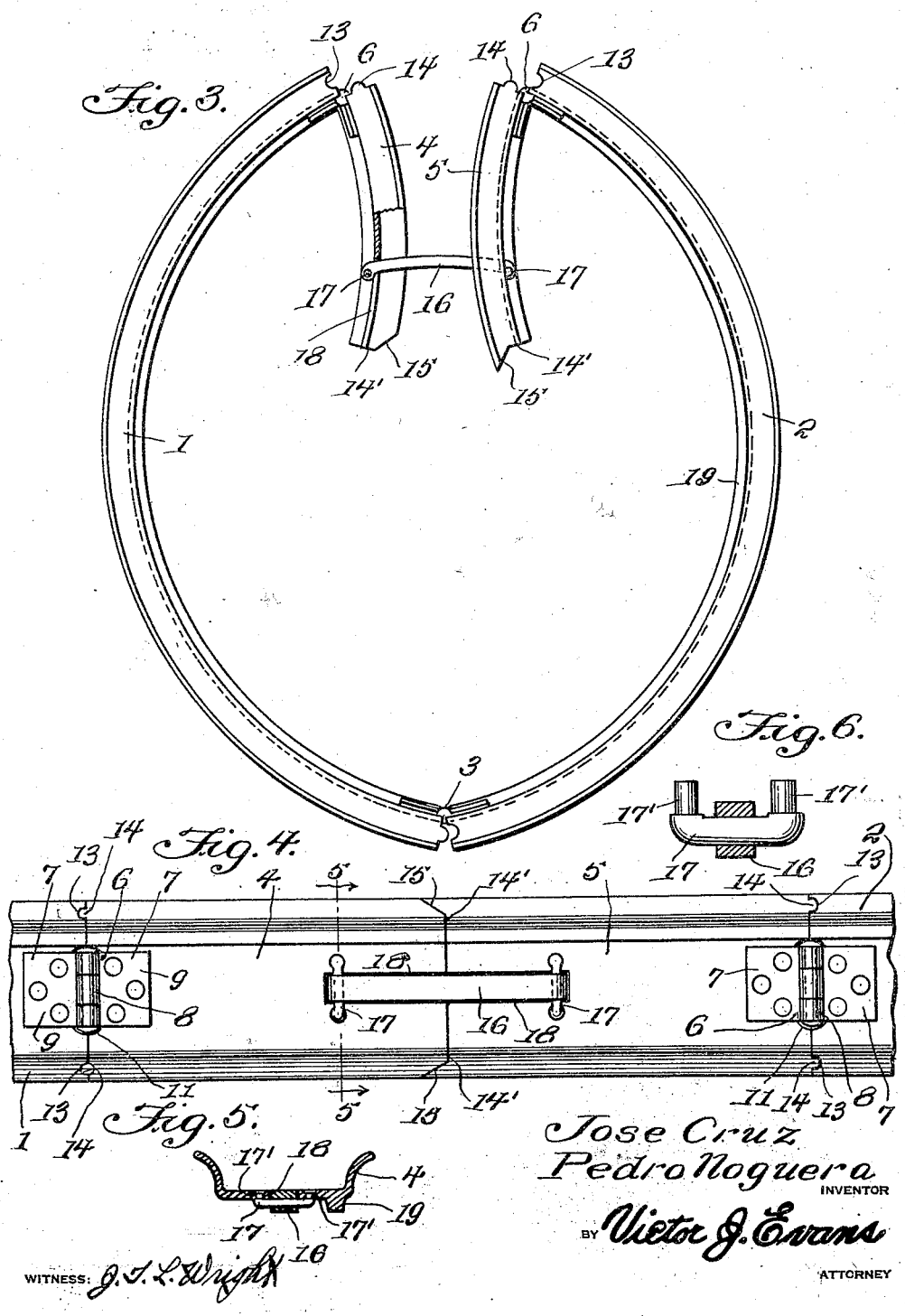

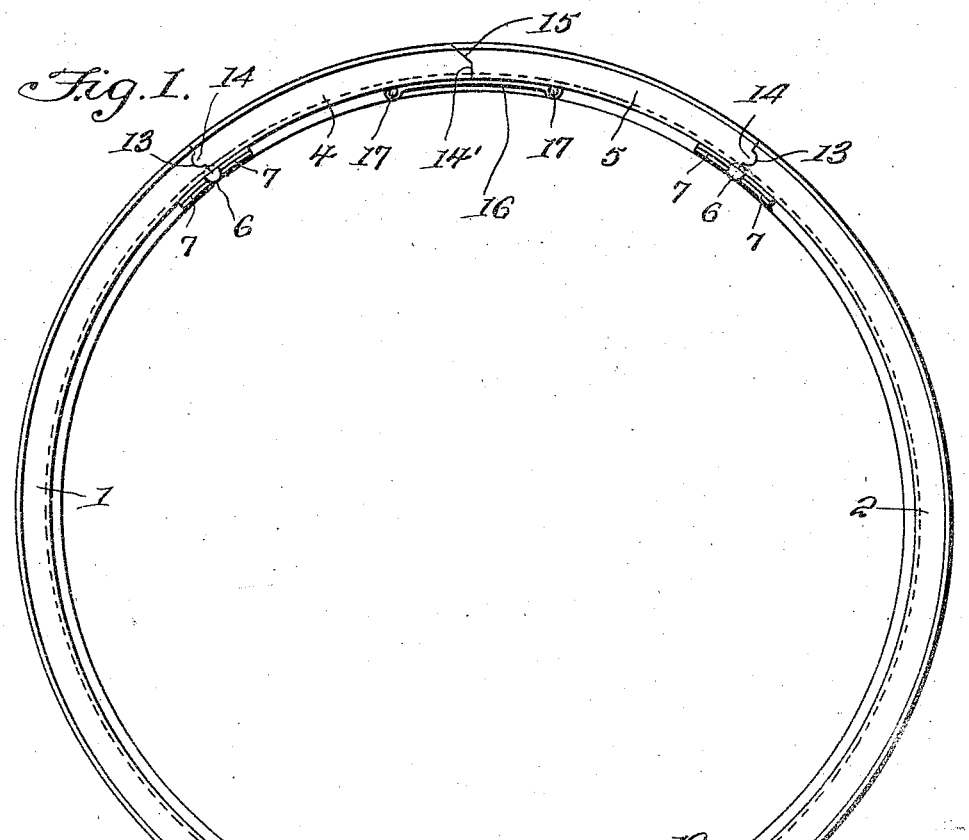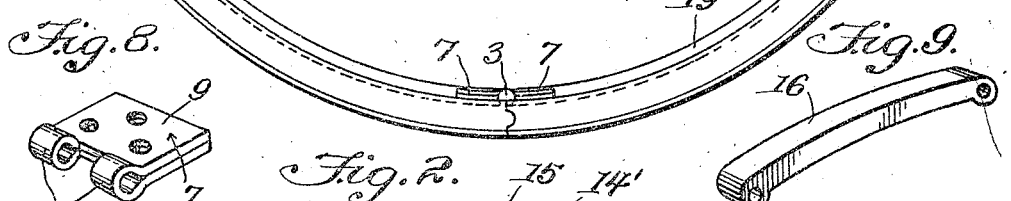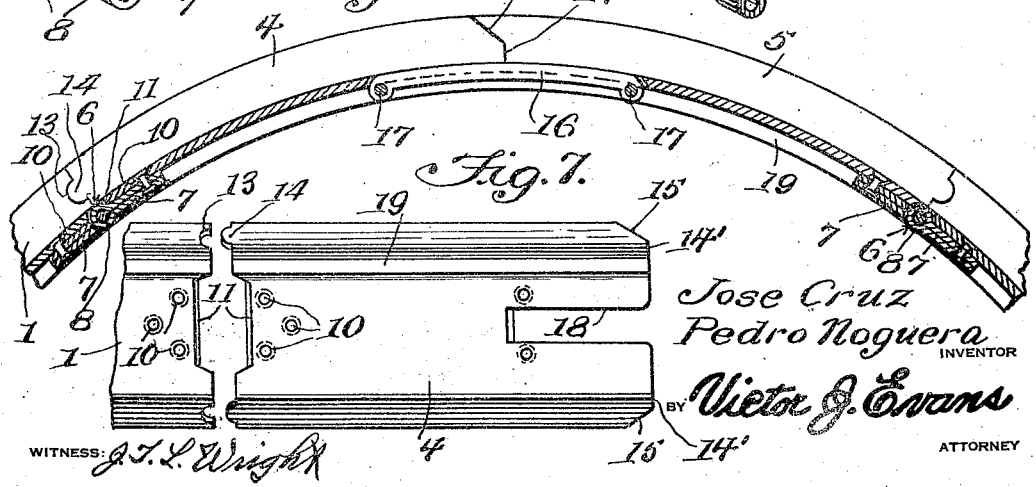

Patented Mar. 15, 1927.

1,621,460

UNITED STATES PATENT OFFICE.

JOSE CRUZ AND PEDRO NOGUERA, OF SHELTON, CONNECTICUT.

AUTOMOBILE TIRE RIM.

Application filed April 29, 1925. Serial No. 26,771.

This invention relates to a wheel rim for holding a tire on the wheel, the general object of the invention being to provide a rim formed in sections which are hinged together in such a manner that the rim can be collapsed so that a tire can be easily placed thereon or removed therefrom.

Another object of the invention is to so arrange the hinges and other parts that the rim can be used on wheels as now constructed and the rim can be manufactured to sell at low cost.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings, wherein like characters denote like or corresponding parts throughout the several views, and in which:—

Figure 1 is an elevation of the improved rim.

Figure 2 is a sectional view through the upper portion of the rim shown in Figure 1.

Figure 3 is an elevation, with parts in section, showing the rim collapsed.

Figure 4 is a view of the inner face of the upper portion of the rim shown in Figure 1.

Figure 5 is a section on line 5—5 of Figure 4.

Figure 6 is an enlarged view of one of the fastening members for the link.

Figure 7 is a view of the inner face of one section and a portion of another section.

Figure 8 is a perspective view of one of the hinge parts.

Figure 9 is a view of the link.

In these views, 1 and 2 indicate main rim sections which are hinged together, as at 3, and 4 and 5 indicate supplemental rim sections each of which is hinged to a main rim section, as at 6. Each hinge comprises a pair of members 7, each member being formed from a single blank which is cut and bent, as shown in Figure 8 to form the pin barrels 8 and the flat perforated body part 9 which is of double thickness. The body parts 9 are fastened to the inner faces of the sections by rivets or the like which pass through the perforations in the parts 9 and through the perforations 10 in the sections. The abutting ends of the sections are cut away, as at 11, to receive the barrel parts of the hinges. Ears 14 are formed on an end of a section, on the side walls or flanges thereof, to engage recesses 13 in the abutting end of an adjacent section, so that the abutting ends of the hinged sections will interlock when the rim is expanded.

The free ends of the supplemental sections 4 and 5 have straight parts 14' and beveled parts 15, so as to make a lap joint when the rim is expanded. This form of joint forms an interlocking joint, and the straight abutting parts 14' will prevent a shearing movement between the end parts of the two sections 4 and 5 which would result if the beveled parts 15 were continued through the inner parts of the sections.

In order to hold the rim in expanded condition, the sections 4 and 5 are connected together by a link 16 which is pivoted at its ends to the sections by means of the staple-like members 17 which have their reduced ends 17' fitting in holes formed in the sections, with the extremities of said ends upset to rivet the members to the sections. The adjacent ends of the sections 4 and 5 are each provided with a slot 18 for receiving an edge of the link, when the same is in locking position so that the link will close the slots and thus prevent the tube and flap from being forced into the slots by the air pressure within the tube. The link is of slightly curved construction to conform with that part of the rim which is slotted. The hinges and the fastening means for the link are so arranged as to not extend beyond the rib 19 of the rim.

A tire is removed from the rim by first removing the rim from a wheel, and then pulling outwardly on the section 5 with simultaneous inward pushing of the section 4 to obtain sufficient movement to offset the adjacent ends of these sections. Both sections are then moved inwardly and in this slightly offset relation while the link 16 will draw the main sections 1 and 2 together until the parts assume the position shown in Fig. 3. The tire may then be readily removed from the rim. In expanding the rim, the sections 4 and 5 are pushed outwardly, with the section 5 slightly in advance of the section 4 so that the projecting end of section 5 will engage the cut-away part of section 4, as the ends of the two sections come together. The edge of the link 16 will enter the slots 18 when the device is expanded so as to close the slots. The device is then ready to be placed on a wheel or on a carrier.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A collapsible tire rim comprising a pair of main rim sections, a pair of supplemental rim sections, each of said sections being formed with outwardly extending tire bead receiving flanges at opposite sides, all of said rim sections being adapted for end to end assembly in circumferential relation in expanded tire supporting position, each of said sections having the flanges formed with projections adapted to interfit in sockets formed in the flanges of adjacent sections, independent hinge means securing each of said supplemental sections to one of said main sections and pivotally securing said main sections together, each of said hinge means securing said sections in abutting coincident and tire supporting position, and a link pivotally secured at its ends to the inner faces of said supplemental sections intermediate the ends of said sections, said supplemental sections having the end portions slotted to receive said link, said link retaining said supplemental sections with the ends in abutting coincident relation in tire supporting position; whereby the interfitting of the projections in the recesses and the abutting of the ends of the rim sections in expanded tire supporting position directly distributes lateral stress to the rim circumferentially and relieves such stress from application to the link, and hinge means connecting the sections.

In testimony whereof we affix our signatures.

JOSE CRUZ.
PEDRO NOGUERA.